United States Patent
Nelson

(10) Patent No.: US 8,988,907 B2
(45) Date of Patent: Mar. 24, 2015

(54) COMPENSATING ELEMENT CONNECTED TO A POWER LINE THROUGH AN AUTOTRANSFORMER

(75) Inventor: Robert J. Nelson, Orlando, FL (US)

(73) Assignee: Siemens Aktiengesellschaft, München (DE)

( * ) Notice: Subject to any disclaimer, the term of this patent is extended or adjusted under 35 U.S.C. 154(b) by 548 days.

(21) Appl. No.: 13/295,370

(22) Filed: Nov. 14, 2011

(65) Prior Publication Data
US 2013/0119950 A1     May 16, 2013

(51) Int. Cl.
*H02J 1/02*     (2006.01)
*H02J 3/18*     (2006.01)
*H02J 3/24*     (2006.01)
*H02J 1/14*     (2006.01)

(52) U.S. Cl.
CPC ........... *H02J 3/1878* (2013.01); *H02J 3/24* (2013.01); *Y02E 40/30* (2013.01)
USPC ............................... 363/39; 363/131; 363/37

(58) Field of Classification Search
USPC ............... 363/39–41, 131–133, 35, 37
See application file for complete search history.

(56) References Cited

U.S. PATENT DOCUMENTS

| | | | | |
|---|---|---|---|---|
| 3,579,101 A * | 5/1971 | Kusters et al. | ................ | 324/679 |
| 3,611,116 A * | 10/1971 | Balian et al. | ................... | 323/307 |
| 5,408,171 A * | 4/1995 | Eitzmann et al. | ............ | 323/258 |
| 7,180,206 B2 * | 2/2007 | Haugs et al. | ................... | 307/102 |
| 7,821,799 B2 * | 10/2010 | Jacobs | ........................... | 363/47 |
| 7,989,983 B2 * | 8/2011 | Folts et al. | ...................... | 307/82 |
| 8,436,602 B2 * | 5/2013 | Sykes | .......................... | 323/301 |
| 8,519,681 B2 * | 8/2013 | Mathewson | ................... | 323/257 |
| 2004/0223351 A1 * | 11/2004 | Kurokami et al. | ............. | 363/65 |
| 2007/0057651 A1 * | 3/2007 | Hoffman | ....................... | 323/258 |
| 2007/0133241 A1 * | 6/2007 | Mumtaz et al. | ............... | 363/131 |
| 2010/0138061 A1 * | 6/2010 | Walling et al. | ............... | 700/287 |
| 2011/0007537 A1 * | 1/2011 | Fornage | ........................ | 363/132 |
| 2012/0033468 A1 * | 2/2012 | Folts et al. | ...................... | 363/95 |

* cited by examiner

*Primary Examiner* — Adolf Berhane
*Assistant Examiner* — Nusrat Quddus

(57) ABSTRACT

An apparatus for compensating a power system transmission line (46). The apparatus comprises an autotransformer (40) disposed in series with the transmission line (46). An autotransformer series winding (40A) extends from an input terminal (46) to a neutral terminal (44) and a common winding (40B) extends from an output terminal (54) to the neutral terminal (44). A compensating device (42) is connected between the neutral terminal (44) and ground. Although connected in shunt with the transmission line (46), the compensating device (42) operates as a series-connected compensating device relative to the transmission line (46). The autotransformer (40) can be connected in a buck or a boost configuration with a fixed or moveable winding tap (88). Also, two autotransformers (110, 114) can be connected in a back-to-back configuration with the compensating device (42) connected to either autotransformer (110, 114).

29 Claims, 4 Drawing Sheets

COMPENSATING ELEMENT CONNECTED TO A POWER LINE THROUGH AN AUTOTRANSFORMER

FIELD OF THE INVENTION

The embodiments of the present invention relate to providing series compensation for a power line, and in particular to the use of an autotransformer to supply such series compensation.

BACKGROUND OF THE INVENTION

Power line compensation is required to ensure that a sufficient amount of power is efficiently delivered from power generators to loads without causing overloads or other operating problems. Proper power system control reduces or eliminates such system problems as excessive line loadings, voltage transients and fluctuations and rapid changes in reactive power on the power system. These events may be caused by the effects of line switching, line faults, and rapidly varying active or reactive system loads.

During the past few decades, the increase in demand for electrical energy has imposed more stringent requirements on the power industry, requiring more power plants, substations and transmission lines. However, the most commonly used devices for controlling power systems have been mechanically-controlled circuit breakers. The "on/off" characteristics of these devices make them unsuitable for smoothly handling frequently-changing loads and damping transient oscillations. To overcome these drawbacks, substantial operating margins and redundancies are imposed to protect the power system from dynamic instabilities and to permit quick recovery after faults. These conditions increase the power system cost and complexity and lower system efficiency. Power system compensation can be divided into two categories, i.e., shunt compensation and series compensation.

A power system 10 comprises a generator 12 generating a voltage V at a phase angle of δ/2 and a generator 14 generating a voltage V at a phase angle of −δ/2. A transmission line reactance is segregated into two reactances Xl/2. The power system 10 further comprises shunt capacitance compensation in the form of a capacitor 20 connected at between a midpoint 21 (between the two generators 22 and 24) and ground. The voltage magnitude at the midpoint 21 is maintained at a voltage V. The capacitor 20 can inject an amount of reactive power given by $$Q_c = V^2 / Xc$$

where V is the midpoint voltage, and
Xc is the capacitive reactance of the capacitor.

The capacitor helps maintain the voltage level on the transmission line by supplying reactive power to the transmission line. The ability to add reactive power increases the operational margin and the system stability.

Shunt reactive compensation can be similarly employed to consume (absorb) reactive power from the transmission line. Shunt-connected reactors reduce line over-voltage conditions by consuming reactive power. The reactors are controllable to control the amount of reactive power that is absorbed.

Shunt compensation, especially shunt reactive compensation, is widely used in transmission system to regulate the voltage magnitude, improve the voltage quality, and enhance system stability.

Series compensation attempts to directly control the overall series line impedance (Xl) of the transmission line. It can be shown that AC power transmission is limited primarily by the series reactive impedance of the transmission line. A series-connected capacitor can add a voltage in opposition to the transmission line voltage and thereby reduce the effective line impedance. A simplified model of a transmission system 30 with series compensation is shown in FIG. 2. The voltage magnitudes of the two buses are assumed equal (V) and the phase angle between them is designated δ. The transmission line is assumed lossless and represented by the reactance Xl. A controllable capacitor 32 is series-connected to the transmission line 34 and imposes a voltage Vc in opposition to the nominal transmission line voltage Vl.

The phasor diagram of FIG. 3 illustrates the associated phasors.

Lowering the line inductive reactance using series capacitors is an effective technique for increasing power transfer capability, improving transient and steady state stability, reducing rapid voltage fluctuations, and reducing line losses. These benefits are achieved because, as mentioned above, the series-connected capacitors partially compensate the inductive reactance of the transmission lines.

BRIEF DESCRIPTION OF THE DRAWINGS

The invention is explained in the following description in view of the drawings that show.

DETAILED DESCRIPTION OF THE INVENTION

Figure 1:
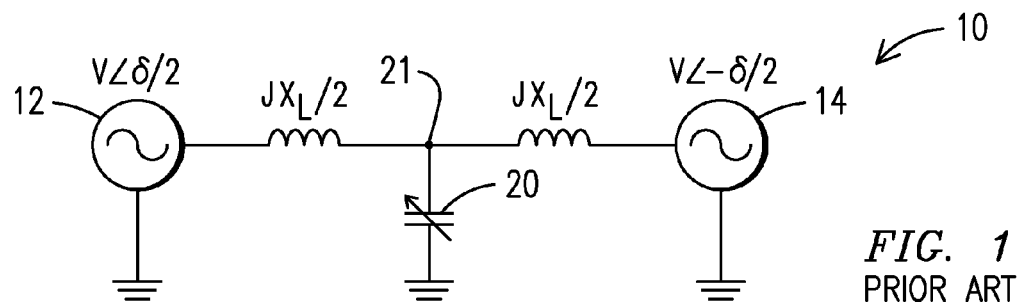
FIG. 1 is a prior art power system model with capacitive shunt compensation.
Figure 2:
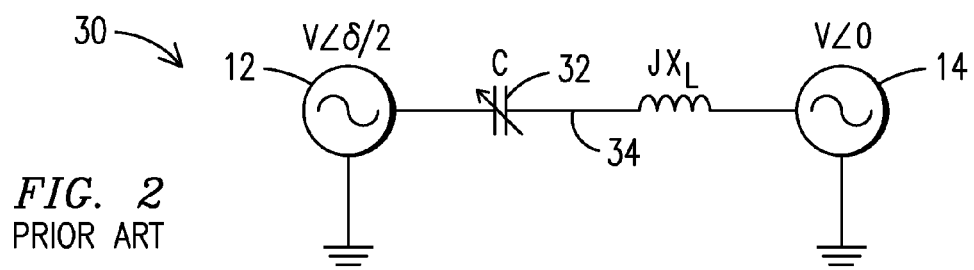
FIG. 2 is a prior art power system model with capacitive series compensation.
Figure 3:
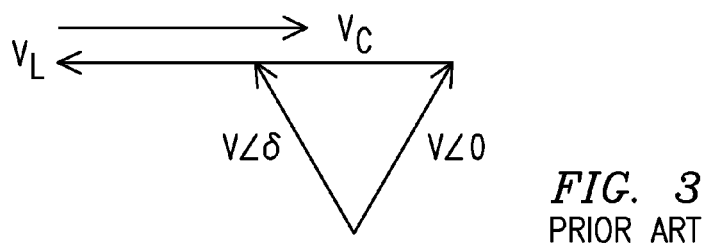
FIG. 3 is a phasor diagram of the model of FIG. 2.

Before describing in detail the particular methods and apparatuses related to series compensation of a power system employing an autotransformer in accordance with various embodiments of the present invention, it should be observed that the present invention, in its various embodiments, resides primarily in a novel and non-obvious combination of hardware and method steps related to said method and apparatus. Accordingly, the hardware and method steps have been represented by conventional elements in the drawings, showing only those details that are pertinent to the present invention so as not to obscure the disclosure with structural details that will be readily apparent to those skilled in the art having the benefit of the present description.

The following embodiments are not intended to define limits of the structures or methods of the invention but only to provide exemplary constructions. The embodiments are permissive rather than mandatory and illustrative rather than exhaustive.

Most reactive compensation on power systems is shunt-connected as described above. Shunt compensation (which absorbs (using a reactor) or supplies (using a capacitor) reactive power or voltage) provides many advantages. The components associated with this compensation scheme are easily connected to the power system and are easily protected against the effects of transient faults and other potentially harmful power system conditions. The supplied reactive voltage typically displays a fairly constant magnitude, varying within a narrowly prescribed range. The supplied voltage indiscriminately provides reactive power support for all equipment in the area proximate the capacitor connection. Also, the shunt compensation technique seldom produces any destructive influences on other power system components.

The ground connection of the capacitor or reactor permits easy monitoring to detect abnormal or excessive current flows or abnormal voltages. Protection methods for shunt-connected equipment are well-known and straightforward. Upon detection of an abnormal situation, the shunt-connected component can be removed from service before any significant damage has occurred. Thus, shunt compensation is considered a relatively safe form of power systems compensation.

However, shunt compensation is relatively ineffective for controlling power flow and for damping power system oscillations. In contrast, series compensation can be selectively applied to the most heavily and lightly loaded transmission lines and to those specific transmission elements that may produce or be most significantly affected by oscillatory behavior.

Typically, a transmission system is constrained by the capability of its most limiting component. Thus applying series compensation to the most-limiting component is the most efficient technique for increasing power transfer limits. Additionally, unlike shunt compensation, which can often mask voltage collapse until it is imminent, series compensation allows earlier detection of a voltage collapse.

But series compensation is used much less frequently than shunt compensation. This form of compensation has several severe shortcomings. Unlike shunt compensation where one terminal is at ground or neutral potential, both terminals of a two-terminal series device are at line potential. Taking a series device out of service typically requires applying a short circuit in parallel with the device, often creating undesirable power system transients.

Also, because they are in series with the transmission line, the series compensating devices must be reinforced to carry line short circuit currents or they must have a parallel component that has this capability. Series equipment, in a line that can be taken out or placed in service arbitrarily, greatly complicates the protection of the line and other elements in series with it. Series compensation device also complicate measurements of fundamental power system quantities because it is necessary to insulate measurement equipment.

In particular, series compensation is normally in the form of series capacitor compensation where the series capacitance cancels transmission line series reactance. However, adding series capacitance causes series resonance in a transmission line at a frequency of $$fres = fo \times \sqrt{(Xc/Xl)},$$

where fo is the nominal system frequency (normally 60 Hz or 50 Hz),
Xc is the series capacitive reactance (i.e., the series compensation) and
Xl is the transmission line inductive reactance.

Since Xc is less than Xl for power system operation, the resonant frequency, fres, is always less than the nominal frequency. System perturbations can excite a generator torsional mode at the frequency fres. This resonance at fres can generate destructive shaft oscillations, sometimes called sub-synchronous resonance, or SSR. It is also possible to excite oscillatory behavior in electronic controls (sometimes called subsynchronous interaction, or SSI), and subsynchronous self-excitation of induction generators (SSSE).

Because of the many negative impacts of series compensation on power system operation and the physical difficulties associated with installing, maintaining, and monitoring series-connected equipment (which normally requires use of a high-voltage platform during installation and maintenance), series compensation is seldom used on power systems, despite its many significant operating advantages.

The presented embodiments describe a technique and apparatus for implementing series compensation with a shunt-connected device, interfacing to the transmission line with an autotransformer. This technique offers the benefits of series compensation with many advantageous attributes associated with shunt compensation.

Figure 4:
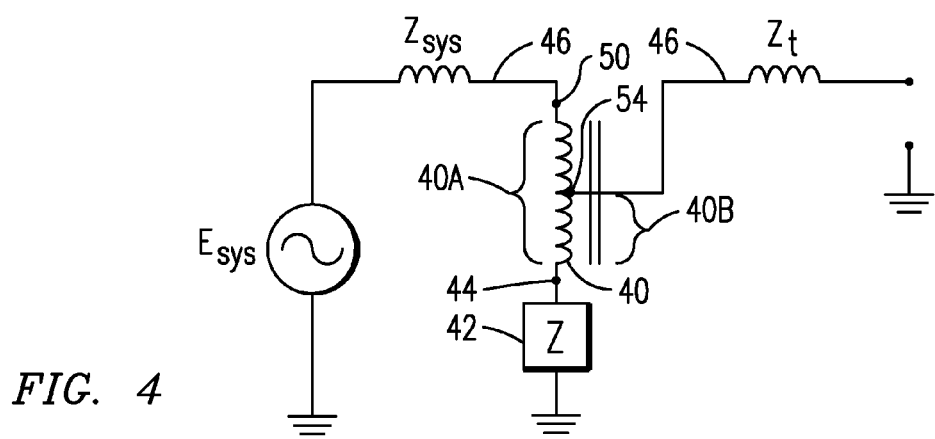
FIG. 4 is an illustration of a "buck" embodiment of an autotransformer series compensator.

As illustrated in FIG. 4, consider an autotransformer 40 connected to a 3-phase balanced impedance (Z) 42, which is in turn connected between an autotransformer neutral terminal 44 and ground, i.e., impedance element Z represents a shunt connected reactance relative to a transmission line 46.

Esys represents a voltage on the transmission line 46, Zsys represents an impedance of the transmission system 46 to the autotransformer and Zt represents the leakage reactance of the autotransformer.

The autotransformer 40 comprises a series winding 40A with Ns turns and a common winding 40B with Nc turns. The series winding comprises all turns in the autotransformer and the common winding comprises those turns that are common to both the input and output sides of the autotransformer. The series winding extends from an input terminal 50 (which in this embodiment comprises a series winding terminal) to the neutral terminal 44. The common winding extends from an output terminal 54 (which in this embodiment comprises a fixed winding tap terminal) to the neutral terminal 44.

The autotransformer 40 exhibits the following relationships. The ampere-turns must be balanced on the primary and secondary sides as expressed by the relationship, $$NcIc = NsIs$$

The primary/secondary voltage ratio is proportional to the turns ratio as set forth in, $$Vs/Ns = Vc/Nc \text{ or } VsNc = Ns/Nc$$

Thus as connected in FIG. 4, the autotransformer 40 operates in a "buck" mode (i.e., the input voltage greater than the output voltage).

Let $\alpha$ represent the autotransformer "co-ratio" of Ns/(Ns+Nc) and let $\beta$ represent the autotransformer turns ratio of Ns/Nc.

Then it can be shown by substituting from the above relationships, that $$I = Is + Ic = Ic(Nc/Ns) + Ic = Ic/\alpha = Ic(1+1/\beta) = Is(1/(1-\alpha))$$
$$= Is(1+\beta)$$

Figure 5:
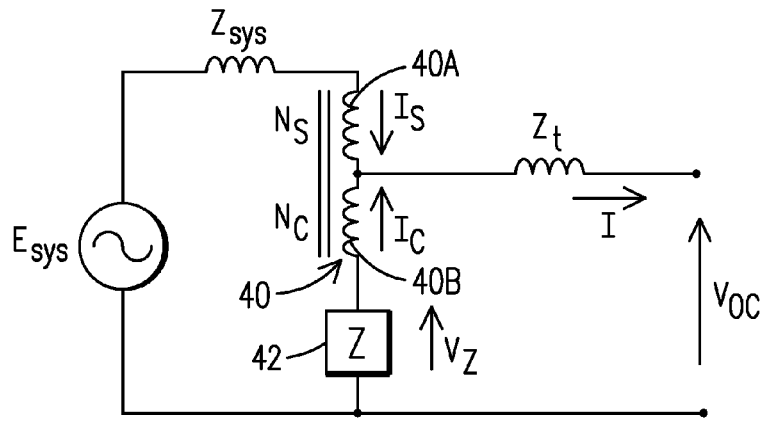
FIGS. 5 and 6 are circuit representations of the FIG. 4 installation for use in determining a Thevenin equivalent circuit of the first embodiment.

The schematic diagram of FIG. 5 indicates the relevant voltages and currents with arrowheads. Referring to FIG. 5 and solving for the Thevenin equivalent open circuit voltage, $$Voc = Esys(Nc/(Nc+Ns)) = Esys(1-\alpha)$$

Next determine the short circuit current (Isc) from which the Thevenin impedance can be determined. See FIG. 6.

Writing a mesh equation for mesh 1:

$$Esys = IsZsys + Vs + Vc - IcZ$$

After algebraic manipulation and substituting in the term $\alpha$:

$$Esys = (1-\alpha)IZsys + Vc(1/(1-\alpha)) - \alpha IZ \quad (1)$$

Writing a mesh equation for mesh 2:

$$Vc - IcZ = IZt$$

Rearranging the terms and substituting $\alpha$ again yields:

$$Vc = \alpha IZ + IZt \quad (2)$$

Substituting equation (2) into equation (1) yields:

$$Esys = (1-\alpha)IZsys + (\alpha IZ + IZt)/(1-\alpha) - \alpha IZ$$

Simplifying and rearranging terms, $$Esys(1-\alpha) = I[(1-\alpha)^2 Zsys + Zt + \alpha^2 Z]$$

Figure 7:
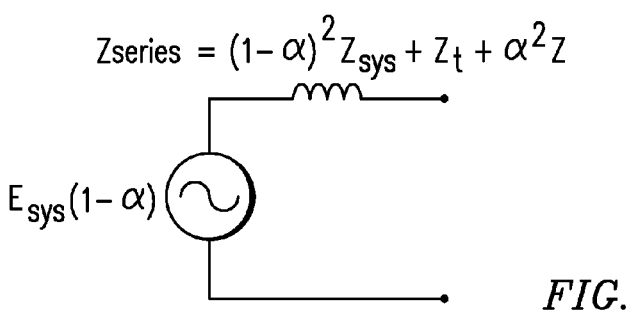
FIG. 7 is the Thevenin equivalent circuit of the first embodiment.

From this equation the corresponding Thevenin equivalent circuit can be determined as illustrated in FIG. 7.

Analyzing this Thevenin equivalent circuit, it is observed that Zsys and Zt are series circuit components that appear in the Thevenin equivalent circuit as series circuit components. The compensating component Z is shunt connected, but appears as a series component in the Thevenin equivalent circuit scaled by a factor $\alpha^2$. In deriving the Thevenin equivalent circuit no conditions were imposed on the compensating impedance Z. It could represent a capacitor, an inductor, a resistance, a negative resistance (i.e., a generator). Z could represent a variable impedance or a constant impedance. Z could also represent the equivalent apparent impedance of a voltage sourced converter with a voltage of Vz and a current of Ic. Z could also represent a phase shifter (a phase shifting device). Commonly, a phase shifter comprises a series transformer that injects a voltage in quadrature with the system voltage to advance or retard power flow at the point of connection. Z could represent a device that injects a voltage such that the vector product of the current and Z injects a voltage with an appropriate phase shift.

Figure 6:
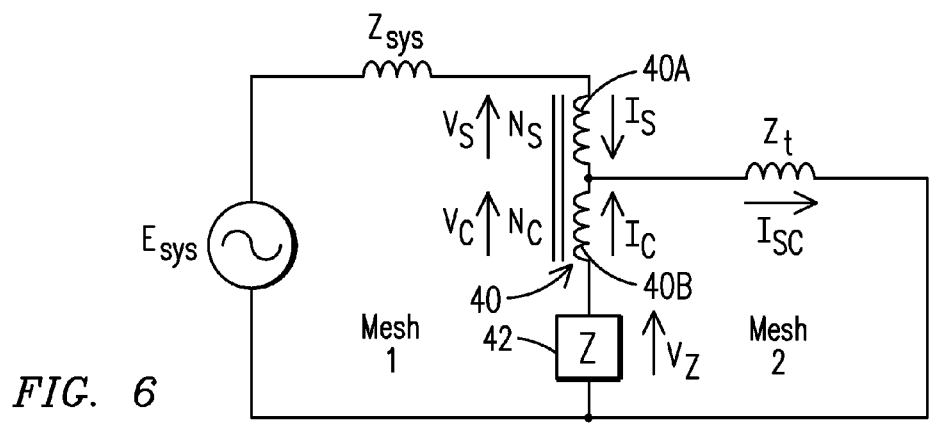

The only requirement imposed on Z for the above derivation is that it carry the same current as the autotransformer common winding, which can be seen from FIGS. 4, 5 and 6.

Consequently, these concepts could be advantageously used to interface any one or more of the following to the power system: a fixed-value or variable capacitor, a fixed-value or variable reactor, a STATCOM (static synchronous compensator), a SVC (static VAR compensator), an output of an electrical generator, an output from a wind turbine park.

As illustrated, when using an autotransformer, an impedance Z (element 42) connected in parallel with the transmission line 46 has the same effect as a series impedance of value ($\alpha^2 Z$). For example, if $\alpha$ equals 0.2 and Z is a capacitive reactance having a value 1 ohm, the equivalent series capacitance that is effectively inserted into the transmission line has a value of 0.04 ohms.

FIGS. 4-7 described above illustrate an autotransformer in a "buck" circuit arrangement or "buck" mode. In a "buck" mode the input voltage appears across the series winding and the series winding has a greater number of turns than the common winding. The output voltage appears across the common winding. Therefore the input voltage is greater than the output voltage.

It is also possible to provide similar advantages when the autotransformer is used in a "boost" configuration (i.e., the input voltage appearing across a fewer number of turns than the input voltage and therefore the input voltage less than the output voltage) as described below.

Figure 8:
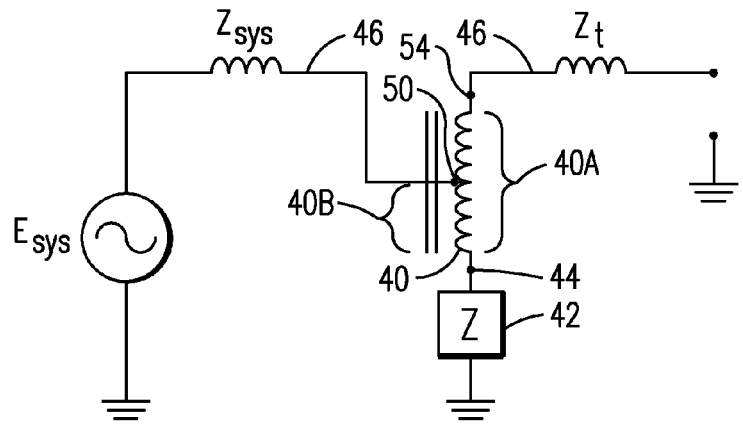
FIG. 8 is an illustration of a "boost" embodiment of an autotransformer series compensator.

The "boost" configuration is illustrated in FIG. 8, where the input voltage is supplied across the common winding 40B with Nc turns and the output voltage is taken across the series winding 40A with Ns turns. Since Ns is greater than Nc, the output voltage is greater than the input voltage, which defines a "boost" condition. In this embodiment too, impedance element Z 42 represents a shunt connected reactance relative to the transmission line 46.

In FIG. 8 the input terminal 50 is the fixed winding tap terminal of the autotransformer 40 and the output terminal 54 is the series winding terminal. Note the different terminal designations for the "buck" mode of FIG. 4 and the "boost" mode of FIG. 8.

Figure 9:
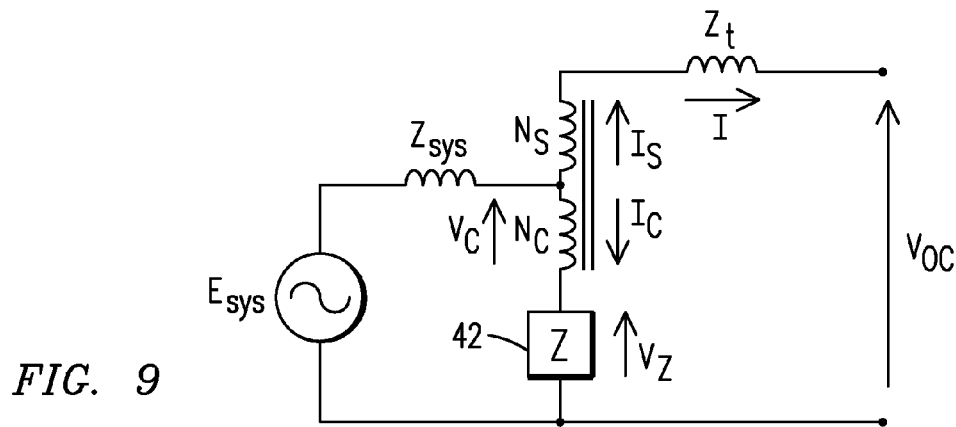
FIGS. 9 and 10 are circuit representations for use in determining a Thevenin equivalent circuit of the second embodiment of the invention.

With reference to FIG. 9, solving for the Thevenin equivalent open circuit voltage, $$Voc = Ns/(Nc+Ns)Esys = Esys(1+\beta)$$

Figure 10:
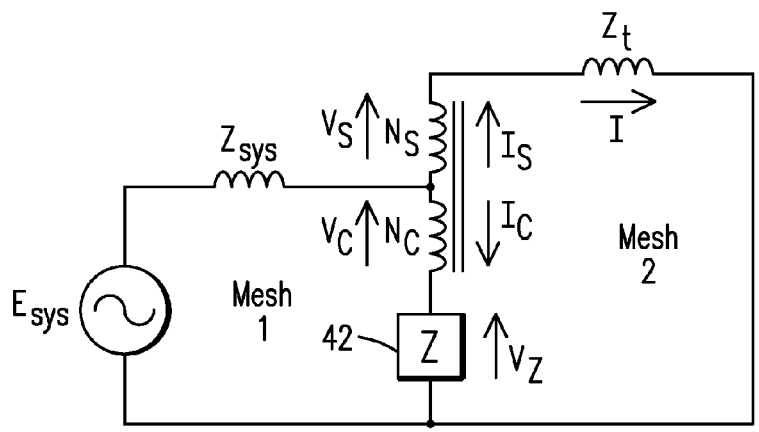

To find the Thevenin equivalent impedance, short the output terminals and write the loop equation for mesh 1. See FIG. 10.

$$Esys = (Is+Ic)Zsys + Vc + IcZ$$

Simplify the determined equation to $$Esys = (1+\beta)IZsys + Vc + \beta IZ \quad (3)$$

Writing the loop equation for mesh 2:

$$Vc + Vs + IcZ = IZt$$

Rearranging and simplifying the mesh 2 equation above, $$Vc = (IZt - \beta IZ)/(1+\beta) \quad (4)$$

Substituting equation (4) into equation (3), $$Esys = (1+\beta)IZsys + (IZt - \beta IZ)/(1+\beta) + \beta IZ$$

$$Esys(1+\beta) = I[(1+\beta)^2 Zsys + Zt + \beta^2 Z]$$

Figure 11:
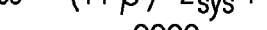
FIG. 11 is the Thevenin equivalent circuit of the second embodiment of the invention.

The corresponding Thevenin equivalent circuit for the "boost" embodiment is depicted in FIG. 11.

As can be seen, the Thevenin equivalent circuit for the "boost" embodiment of FIG. 11 is similar to the previous result illustrated in the Thevenin equivalent circuit for the "buck" embodiment of FIG. 7. Again, the shunt-connected element Z appears as a series impedance but for this embodiment scaled by a factor $\beta^2$.

In the "buck" and "boost" embodiments described above the winding tap terminal that determines the number of turns in the series and the common windings is fixed and thus the autotransformer operates in either a "buck" or a "boost" mode. In another embodiment, the location of the winding tap terminal is adjustable, providing either "buck" or "boost" operation.

Figure 12:
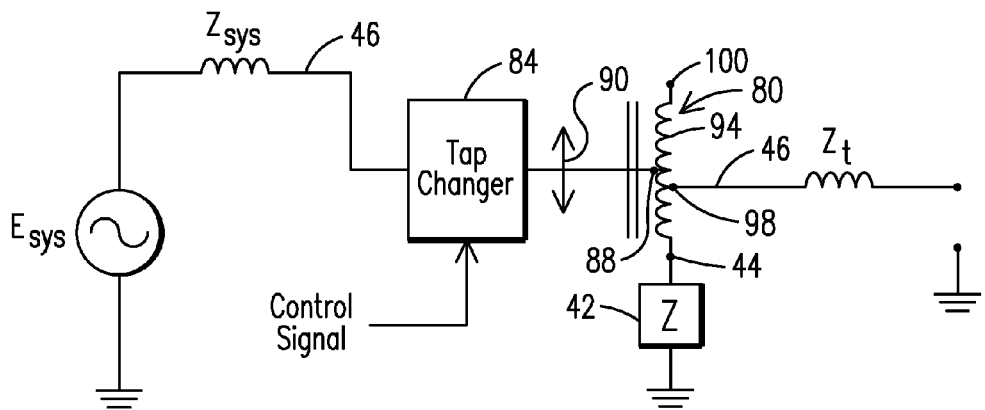
FIG. 12 is an illustration of a "buck/boost" embodiment of an autotransformer series compensator.

FIG. 12 illustrates this embodiment, comprising an autotransformer 80 and a tap changer 84 for controlling a position of a moveable winding tap 88 responsive to a control signal that is further responsive to conditions on the transmission line 46 as to whether a "boost" or a "buck" operational mode is desired. A double arrowhead 90 indicates that the winding tap 88 can be moved to any location on a winding 94 of the autotransformer 80. The autotransformer 80 further comprises an output terminal 98. An input voltage appears across an input segment of the winding 94 (also referred to as an input winding) between the location of the moveable winding tap 88 and the neutral terminal 44. An output voltage appears across an output segment of the winding 94 (also referred to as an output winding) between the output terminal 98 and the neutral terminal 44.

The autotransformer 80 operates in a "buck" mode when the winding tap 88 is moved to a position where the input segment of the winding 94 has more turns than the output segment of the winding 94. The input voltage is greater than the output voltage. With reference to FIG. 12, this condition occurs when the winding tap 88 is between a terminal 100 and the output terminal 98.

Conversely, the autotransformer 80 operates in the "boost" mode when the winding tap 88 is moved such that the input segment of the winding 94 has fewer turns than the output segment. The input voltage is less than the output voltage.

When the autotransformer 80 operates in the buck mode the impedance 42 operates as if connected in series with the transmission line with an effective series impedance of $\alpha^2 Z$, where $\alpha$ comprises a scaling factor equal to Ni/(Ni+No), where Ni is a number of turns in the input segment of the winding 94, No is a number of turns in the output segment of the winding 94, and Z is an impedance of the compensating device.

When the autotransformer 80 operates in the boost mode the impedance 42 operates as if connected in series with the transmission line with an effective series impedance of $\beta^2 Z$, where $\beta$ comprises a scaling factor equal to No/Ni, where No is a number of turns in the output segment of the winding 94, Ni is a number of turns in the input segment of the winding 94, and Z is an impedance of the compensating device.

The adjustable winding tap 88 may comprise a tap changer commonly used on power systems. The tap changer can be adjusted either manually or automatically responsive to the control signal.

In another embodiment two autotransformers can be configured in a back-to-back arrangement, with one or both autotransformers providing series compensation, but with the turns ratios of the two autotransformers adjusted so that the voltage magnitude adjustments cancel, i.e., a product of the voltage increase/decrease associated with one autotransformer and the voltage decrease/increase associated with the other transformer is about one.

Figure 13:
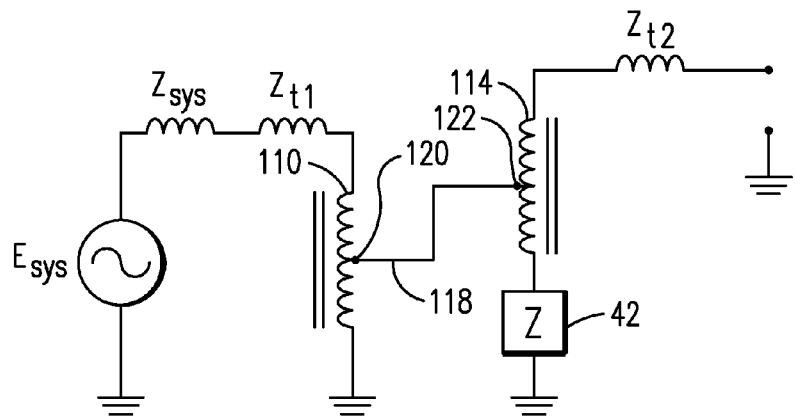
FIG. 13 is an illustration of a back-to-back autotransformer series compensator of the present invention.

FIG. 13 illustrates this back-to-back embodiment comprising an autotransformer 110 connected in a buck configuration (such as illustrated in FIG. 4) and an autotransformer 114 connected in a boost configuration (such as illustrated in FIG. 8). According to another embodiment the autotransformer 110 can be connected in a boost configuration and the autotransformer 114 can be connected in a buck configuration.

A connecting conductor 118 connects an intermediate terminal 120 of the autotransformer 110 to an intermediate terminal 122 of the autotransformer 114.

Zt1 represents the leakage reactance of the autotransformer 110 and Zt2 represents the leakage reactance of the autotransformer 114.

According to this embodiment, either or both of the autotransformers 110 and 114 can provide series compensation with the impedance 42 (or a STATCOM or an SVC as described above) disposed between the autotransformer and ground. However, in the illustrated embodiment of FIG. 13, only the autotransformer 114 is connected to the impedance 42.

Regardless of the autotransformer embodiment used on a transmission system, the system compensation effect is the same. A shunt-connected device, with the attendant operating and maintenance advantages of shunt-connected devices, acts like a series element, with all of the performance benefits of series-connected devices, but without the requirement of using a high voltage platform and the other associated disadvantages of series connected devices.

Although the impedance element 42 may be considered a simple impedance element (e.g., a capacitor or an inductor), in fact the impedance element can comprise an active compensating device, a passive compensating device, a compensating device for adding or absorbing real current to the transmission line, a compensating device for adding or absorbing reactive current to the transmission line, and a compensating device for adding or absorbing a combination of real and reactive current to the transmission line. Thus the elements that can be used to implement any of these functions include: a fixed-value capacitor, a variable capacitor, a fixed-value reactor, a variable reactor, a device for introducing negative resistance, a voltage-sourced converter, a STATCOM, and an SVC. The device for introducing negative resistance comprises an electrical generator or a wind turbine park output. The STATCOM and the SVC can also provide a fixed or a variable compensation.

This scheme could also be used to interface series capacitors (while physically connecting the capacitors in shunt). In this arrangement, mitigation for subsynchronous effects could be more easily accomplished than when the capacitors are installed in series, making currents difficult to accurately measure because of the need for insulated metering equipment in a high voltage system characterized by high levels of electrical interference and noise. For example, the shunt capacitors could be placed in series with a relatively low capacity STATCOM that blocks SSR currents. Alternatively, a parallel or series combination of series capacitors and an electronic controller, such as a STATCOM can be used to suppress subsynchronous oscillations. Alternatively, the impedance, Z, can be replaced with the output of a type 4 (full converter) wind turbine park. Type 4 wind parks can be made immune from SSR, since they use an interface that is very similar to a STATCOM. In this manifestation, the park could inject an equivalent negative series resistance. In another application, a quadrature voltage could be inserted by using an auxiliary delta-wound transformer and using the autotransformer as a phase shifter without the need for a series transformer. This application is feasible for high-voltage phase shifter applications, which are generally limited to relatively low transmission voltages (345 kV and less) because of limitations on series wound transformers.

The embodiments described offer an easy and almost universally applicable method of inserting a series element (impedance, voltage source, etc.) into a line with a relatively inexpensive and widely available piece of equipment (an autotransformer). Although the autotransformer described may have some special requirements (e.g., an insulated neutral, the ability to carry high short circuit currents during abnormal conditions and to bypass the shunt-connected element either with a switch or with a surge arrester, etc.), the performance requirements are not significantly more than what is required of a conventional autotransformer used in a power system application.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus for compensating a power system transmission line, the apparatus comprising:
an autotransformer comprising a series winding disposed between an input terminal and a neutral terminal, an output terminal connected to a point on the series winding between the input terminal and the neutral terminal, a common winding comprising a portion of the series winding extending from the neutral terminal to the output terminal, the input terminal connected to a first terminal end of the transmission line and the output terminal connected to a second terminal end of the transmission line;

a compensating device connected between the neutral terminal and a ground terminal in parallel with the transmission line while providing series compensation to the transmission line; and wherein the compensating device has an effective impedance of $\alpha^2 Z$, where $\alpha$ comprises a scaling factor equal to Ns/(Ns+Nc), where Ns is a number of turns in the series winding and Nc is a number of turns in the common winding, and Z is an impedance of the compensating device.

2. The apparatus of claim 1 wherein the output terminal comprises a winding tap terminal of the autotransformer and the input terminal comprises a series winding terminal of the autotransformer.

3. The apparatus of claim 1 wherein the compensating device comprises one or more of an active compensating device, a passive compensating device, a compensating device for adding or absorbing real current to the transmission line, a compensating device for adding or absorbing reactive current to the transmission line, and a compensating device for adding or absorbing a combination of real and reactive current to the transmission line.

4. The apparatus of claim 1 wherein the compensating device comprises one of a fixed-value capacitor, a variable capacitor, a fixed-value reactor, a variable reactor, a device for introducing a negative resistance, a device that produces a phase shift of the voltage waveform, a voltage-sourced converter, a static synchronous compensator, a static volt-ampere reactive compensator, a generator, and a static or dynamic electrical device.

5. The apparatus of claim 4 wherein the device for introducing negative resistance comprises one of an electrical generator and a wind turbine park output.

6. The apparatus of claim 4 wherein the static synchronous compensator and the static volt-ampere reactive compensator provide a variable compensation.

7. The apparatus of claim 1 wherein the compensating device comprises a series arrangement of a capacitor and a static synchronous compensator to block subsynchronous resonance currents.

8. An apparatus for compensating a power system transmission line, the apparatus comprising:

an autotransformer comprising a series winding disposed between an output terminal and a neutral terminal, an input terminal connected to a point on the series winding between the output terminal and the neutral terminal, a common winding extending from the neutral terminal to the input terminal, the input terminal connected to a first terminal end of the transmission line and the output terminal connected to a second terminal end of the transmission line;

a compensating device connected between the neutral terminal and a ground terminal in parallel with the transmission line while providing series compensation to the transmission line; and wherein the compensating device has an effective impedance of $\beta^2 Z$, where $\beta$ comprises a scaling factor equal to Ns/Nc, where Ns is a number of turns in the series winding, Nc is a number of turns in the common winding, and Z is an impedance of the compensating device.

9. The apparatus of claim 8 wherein the output terminal comprises a series winding terminal of the autotransformer and the input terminal comprises a winding tap terminal of the autotransformer.

10. The apparatus of claim 8 wherein the compensating device comprises one or more of an active compensating device, a passive compensating device, a compensating device for adding or absorbing real current to the transmission line, a compensating device for adding or absorbing reactive current to the transmission line, and a compensating device for adding or absorbing a combination of real and reactive current to the transmission line.

11. The apparatus of claim 8 wherein the compensating device comprises one of a fixed-value capacitor, a variable capacitor, a fixed-value reactor, a variable reactor, a device for introducing a negative resistance, a device that produces a phase shift of the voltage waveform, a voltage-sourced converter, a static synchronous compensator, a static volt-ampere reactive compensator a generator, and a static or dynamic electrical device.

12. The apparatus of claim 11 wherein the device for introducing the negative resistance comprises one of an electrical generator and a wind turbine park output.

13. The apparatus of claim 11 wherein the static synchronous compensator and the static volt-ampere reactive compensator provide a variable compensation.

14. The apparatus of claim 8 wherein the compensating device comprises a series arrangement of a capacitor and a static synchronous compensator to block subsynchronous resonance currents.

15. An apparatus for compensating a power system transmission line, the apparatus having an input terminal, an output terminal and a neutral terminal, the input and output terminals for connecting to the transmission line to place the apparatus in series with the transmission line, the apparatus comprising:

an autotransformer comprising an input winding and an output winding, the input winding and the output winding sharing a neutral terminal, the input winding extending from the neutral terminal to the input terminal and an input voltage appearing across the input winding, the output winding extending from the neutral terminal to the output terminal, an output voltage appearing across the output winding;

a tap changer for changing a location of the input terminal thereby changing a number of turns in the input winding, wherein if the number of turns in the input winding is greater than a number of turns in the output winding the autotransformer operates in a buck mode with the input voltage greater than the output voltage, and wherein if the number of turns in the input winding is less than the number of turns in the output winding, the autotransformer operates in a boost mode with the input voltage less than the output voltage; and a compensating device connected between the neutral terminal and the ground terminal, the compensating device operating as a series-connected compensating device relative to the transmission line.

16. The apparatus of claim 15 wherein the compensating device comprises one or more of an active compensating device, a passive compensating device, a compensating device for adding or absorbing real current to the transmission line, a compensating device for adding or absorbing reactive current to the transmission line, and a compensating device for adding or absorbing a combination of real and reactive current to the transmission line.

17. The apparatus of claim 15 wherein the compensating device comprises one of a fixed-value capacitor, a variable capacitor, a fixed-value reactor, a variable reactor, a device for introducing a negative resistance, a device that produces a phase shift of the voltage waveform, a voltage-sourced converter, a static synchronous compensator, a static volt-ampere reactive compensator, a generator, and a static or dynamic electrical device.

18. The apparatus of claim 10 wherein the device for introducing the negative resistance comprises one of an electrical generator and a wind turbine park output.

19. The apparatus of claim 17 wherein the static synchronous compensator and the static volt-ampere reactive compensator provide a variable compensation.

20. The apparatus of claim 15 wherein when operating in the buck mode the compensating device operates as if connected in series with the transmission line with an effective impedance of $\alpha^2$ Z, where $\alpha$ comprises a scaling factor equal to Ni/(Ni+No), where Ni is a number of turns in the input winding and No is a number of turns in the output winding, and Z is an impedance of the compensating device;

and when operating in the boost mode the compensating device operates in the bas if connected in series with the transmission line with an effective impedance of $\beta^2$ Z, where $\beta$ comprises a scaling factor equal to No/Ni, where No is a number of turns in the output winding, Ni is a number of turns in the input winding, and Z is an impedance of the compensating device.

21. The apparatus of claim 15 wherein the tap changer is responsive to a control signal further responsive to conditions on the power system transmission line.

22. The apparatus of claim 15 wherein the compensating device comprises a series arrangement of a capacitor and a static synchronous compensator to block subsynchronous resonance currents.

23. An apparatus for compensating a power system transmission line, the apparatus having an input terminal, an output terminal for connecting to the transmission line to place the apparatus in series with the transmission line, the apparatus comprising:

a first autotransformer comprising a first series winding extending from the input terminal to a first neutral terminal, and further comprising a first common winding extending from an intermediate terminal to the first neutral terminal, the first common winding comprising a portion of the first series winding, a first input voltage developed across the first series winding, the first autotransformer operating in a buck mode with a first output voltage developed across the first common winding lower than the first input voltage by a first factor;

a second autotransformer comprising a second series winding extending from the output terminal to a second neutral terminal, and further comprising a second common winding extending from a second intermediate terminal to the second neutral terminal, the second common winding comprising a portion of the second series winding, a second input voltage developed across the second common winding, the second autotransformer operating in a boost mode with a second output voltage developed across the second series winding higher that the second input voltage by a second factor;

wherein a product of the first and second factors is about one; and a compensating device connected between the second neutral terminal and a ground terminal, the compensating device operating as a series connected compensating device relative to the transmission line.

24. The apparatus of claim 23 wherein the first and the second intermediate terminals each comprise a winding tap terminal of the respective first and second autotransformers.

25. The apparatus of claim 23 wherein the compensating device comprises one or more of an active compensating device, a passive compensating device, a compensating device for adding or absorbing real current to the transmission line, a compensating device for adding or absorbing reactive current to the transmission line, and a compensating device for adding or absorbing a combination of real and reactive current to the transmission line.

26. The apparatus of claim 23 wherein the compensating device comprises one of a fixed-value capacitor, a variable capacitor, a fixed-value reactor, a variable reactor, a device for introducing negative resistance, a device that produces a phase shift of the voltage waveform, a voltage-sourced converter, a static synchronous compensator, a static volt-ampere reactive compensator, a generator, and a static or dynamic electrical device.

27. The apparatus of claim 26 wherein the device for introducing negative resistance comprises one of an electrical generator and a wind turbine park output.

28. The apparatus of claim 23 wherein the static synchronous compensator and the static volt-ampere reactive compensator provide a variable compensation.

29. The apparatus of claim 23 wherein the compensating device operates as if connected in series with the transmission line with an effective impedance of $\beta^2$ Z, where $\beta$ comprises a scaling factor equal to Ns2/Nc2, where Ns2 is a number of turns in the second series winding, Nc2 is a number of turns in the second common winding, and Z is an impedance of the compensating device.

* * * * *